(12) United States Patent
Choi

(10) Patent No.: US 7,515,236 B2
(45) Date of Patent: Apr. 7, 2009

(54) LIQUID CRYSTAL DISPLAY DEVICE HAVING OCB MODE LIQUID CRYSTAL LAYER AND METHOD OF FABRICATING THE SAME

(75) Inventor: Kyung-Ho Choi, Ulsan-si (KR)

(73) Assignee: Samsung Mobile Display Co., Ltd., Suwon-si (KR)

( * ) Notice: Subject to any disclaimer, the term of this patent is extended or adjusted under 35 U.S.C. 154(b) by 382 days.

(21) Appl. No.: 11/285,888

(22) Filed: Nov. 22, 2005

(65) Prior Publication Data
US 2006/0114396 A1 Jun. 1, 2006

(30) Foreign Application Priority Data
Nov. 26, 2004 (KR) .................. 10-2004-0098262

(51) Int. Cl.
G02F 1/1343 (2006.01)
G02F 1/1337 (2006.01)
G02F 1/1335 (2006.01)

(52) U.S. Cl. .................. 349/139; 349/129; 349/117
(58) Field of Classification Search .................. 349/139, 349/129, 117, 61–62
See application file for complete search history.

(56) References Cited

U.S. PATENT DOCUMENTS

| 6,160,600 | A  | * | 12/2000 | Yamazaki et al. ........... 349/138 |
| 6,515,725 | B1 | * | 2/2003 | Hattori et al. ................ 349/123 |
| 6,753,551 | B2 | * | 6/2004 | Cheng ......................... 257/79 |
| 2003/0156237 | A1 | * | 8/2003 | Lin et al. ..................... 349/110 |

FOREIGN PATENT DOCUMENTS

| JP | 2001-154200 | * | 6/2001 |
| JP | 2002-296596 |   | 10/2002 |
| JP | 2002-357829 |   | 12/2002 |
| JP | 2003-228085 |   | 8/2003 |
| KR | 2001-0031564 |   | 4/2001 |
| KR | 2001-0060522 |   | 7/2001 |
| KR | 2001-0088285 |   | 9/2001 |
| KR | 2001-0090761 |   | 10/2001 |
| KR | 2002-0097025 |   | 12/2002 |
| KR | 2003-0007066 |   | 1/2003 |
| KR | 2003-0053829 |   | 7/2003 |

(Continued)

OTHER PUBLICATIONS

Patent Abstracts of Japan, Publication No. 2002-357829, dated Dec. 13, 2002, in the name of Tetsuya Kawamura.

(Continued)

Primary Examiner—Mike Qi
(74) Attorney, Agent, or Firm—Christie, Parker & Hale, LLP

(57) ABSTRACT

A liquid crystal display device and a method of fabricating the same are provided. The liquid crystal display device includes: a lower substrate having an opening region and a non-opening region adjacent to the opening region; a pixel electrode located on the opening region; an upper substrate located above the lower substrate and having an opposite surface facing the lower substrate; an upper protrusion located on a portion of the opposite surface corresponding to the non-opening region; an opposite electrode located on the upper protrusion; and an OCB mode liquid crystal layer located between the pixel electrode and the opposite electrode.

28 Claims, 6 Drawing Sheets

FOREIGN PATENT DOCUMENTS

| KR | 2003-0069810 | 8/2003 |
| KR | 2004-0062099 | 7/2004 |

OTHER PUBLICATIONS

Patent Abstracts of Japan, Publication No. 2003-228085, dated Aug. 15, 2003, in the name of Hirofumi Yamakita.

Ogawa, N., et al., *Field-Sequential-Color LCD Using Switched Organic EL Backlighting*, SID Digest, 1999, pp. 1098-1101.

Korean Patent Abstract, Publication No. 1020010088285 A, dated Sep. 9, 2005, in the name of Shoichi Hirota et al.

Korean Patent Abstract, Publication No. 1020010090761 A, dated Oct. 19, 2001, in the name of Yasuhumi Asao et al.

Korean Patent Abstract, Publication No. 1020030007066 A, dated Jan. 23, 2003, in the name of Masahiro Baba et al.

Korean Patent Abstract, Publication No. 1020030053829 A, dated Jul. 2, 2003, in the name of Seung Cheol Lee.

Korean Patent Abstract, Publication No. 1020030069810 A, dated Aug. 27, 2003, in the name of Toshiaki Yoshihara et al.

Korean Patent Abstract, Publication No. 1020040062099, dated Jul. 7, 2004, in the name of Jong Hun Woo et al.

Korean Patent Abstracts, Publication No. 1020010060522 A; Publication Date Jul. 7, 2001; in the name of Lee, et al.

Korean Patent Abstracts, Publication No. 1020020097025 A; Publication Date Dec. 31, 2002; in the name of Konno, et al.

Patent Abstracts of Japan, Publication No. 2002-296596; Publication Date Oct. 9, 2002; in the name of Shioda, et al.

\* cited by examiner (a)  (b)  (c)  (d)

LIQUID CRYSTAL DISPLAY DEVICE HAVING OCB MODE LIQUID CRYSTAL LAYER AND METHOD OF FABRICATING THE SAME

CROSS-REFERENCE TO RELATED APPLICATION

This application claims priority to and the benefit of Korean Patent Application No. 10-2004-0098262, filed on Nov. 26, 2004, the entire content of which is incorporated herein by reference.

BACKGROUND OF THE INVENTION

1. Field of the Invention

The present invention relates to a liquid crystal display (LCD) device and, more particularly, to an LCD device having an optically compensated bend (OCB) mode liquid crystal layer.

2. Description of the Related Art

An LCD device has a liquid crystal injected between a pixel electrode and an opposite electrode, and changes alignment of the liquid crystal by forming an electric field between the pixel electrode and the opposite electrode. The changed alignment of the liquid crystal controls transmittance of light to form images.

Of the various types of LCD devices, an optically compensated bend (OCB) type LCD device has a fast response speed and an excellent viewing angle. The OCB type LCD device includes a pixel electrode, a lower alignment layer, an opposite electrode, an upper alignment layer, and a liquid crystal layer having a positive dielectric constant anisotropy $\Delta\epsilon$. The lower and upper alignment layers are rubbed (and/or coated) in the same direction, so that the liquid crystals have a splay alignment. In order to form images in the OCB type LCD device, a high electric field should be formed between the pixel electrode and the opposite electrode. The high electric field changes a tilt angle of the liquid crystals located at a central portion of the liquid crystal layer to an angle of 90° so that the liquid crystals have a bend alignment. This is referred to as a bend transition. In addition, a predetermined voltage is applied between the pixel electrode and the opposite electrode to induce a change of a tilt angle of the rest of the liquid crystals other than the liquid crystals adjacent to the alignment layers and the liquid crystals located at the central portion. Thus, polarization of light which passes through the liquid crystal layer is changed to form images.

In order for the LCD device having a plurality of pixels to implement high resolution images, most of the liquid crystals arranged in the plurality of pixels should be bend-transited. However, this requires a lot of time, and pixels which are not bend-transited may still occur. In order to prevent this, a voltage is increased for the bend transition, leading to a high power consumption.

In order to resolve the above problem, an LCD device having protrusions is disclosed in a Korean Patent Publication (No. 2001-60522). The LCD device includes upper and lower substrates (or first and second substrates) which are facing each other. First and second electrodes are respectively formed on respective inside surfaces of the first and second substrates. Protrusions are disorderedly formed at corresponding locations on each of the first and second electrodes, and alignment layers are formed to cover the protrusions on the respective electrodes. A nematic liquid crystal layer having a positive dielectric constant anisotropy is injected between the alignment layers of the two substrates. Liquid crystal molecules of the liquid crystal layer are aligned to have a predetermined angle to a surface of the substrate along a tilt angle of the protrusions by an anchoring force of the alignment layer, so that they can have a stable bend alignment. As a result, an initial transition voltage can be lowered. However, a disclination line may be generated around the protrusions Because of this, the protrusions, which are disorderly arranged, may cause a display quality degradation.

An LCD device having a structure of promoting a propagation of transition is disclosed in a Japanese Patent Publication (No. 2002-296596). The LCD device includes an array substrate and an opposite substrate with a liquid crystal layer interposed therebetween. The structure of promoting the propagation of transition is located on either of the array and opposite substrates. The structure of promoting the propagation of transition may be an electrode wire line for propagation or a protruding portion. However, controlling alignment of the liquid crystal using only the protruding portion may cause an insufficient bend transition.

An LCD with transition nucleus areas is disclosed in a Korean Patent Publication (No. 2002-97025). The LCD device includes first and second substrates, a plurality of pixel electrodes formed on the first substrate, and a common electrode formed on the second substrate. A first transition nucleus area with a plurality of continuous slant surfaces having a saw-tooth cross-sectional profile is formed on the first substrate layer. A second transition nucleus area with a plurality of continuous slant surfaces having a saw-tooth cross-sectional profile is formed on the second substrate. However, it may be difficult to continuously form the saw-tooth cross-sectional profile in a small area, and controlling alignment of the liquid crystal by only the transition nucleus area having the saw-tooth cross-sectional profile may cause insufficient bend transition.

SUMMARY OF THE INVENTION

An embodiment of the present invention to provide an LCD device which can induce a sufficient bend transition without degrading a display quality.

One embodiment of the present invention provides a liquid crystal display device. The liquid crystal display devices includes: a lower substrate having an opening region and a non-opening region adjacent to the opening region; a pixel electrode located on the opening region; an upper substrate located apart from the lower substrate and having an opposite surface facing the lower substrate; an upper protrusion located on a portion of the opposite surface corresponding to the non-opening region; an opposite electrode located on the upper protrusion; and an OCB mode liquid crystal layer located between the pixel electrode and the opposite electrode.

On embodiment of the present invention provides a method of fabricating a liquid crystal display device. The method includes: forming a pixel electrode on an opening region of a lower substrate having the opening region and a non-opening region adjacent to the opening region; forming an upper protrusion on a portion of an upper substrate corresponding to the non-opening region; forming an opposite electrode on the upper protrusion; attaching the lower and upper substrates opposite in a manner for the opposite electrode to face the lower substrate; and injecting a liquid crystal into a space between the lower and upper substrates to form an OCB mode liquid crystal layer.

BRIEF DESCRIPTION OF THE DRAWINGS

The accompanying drawings, together with the specification, illustrate exemplary embodiments of the present invention, and, together with the description, serve to explain the principles of the invention.

DETAILED DESCRIPTION

Figure 1:
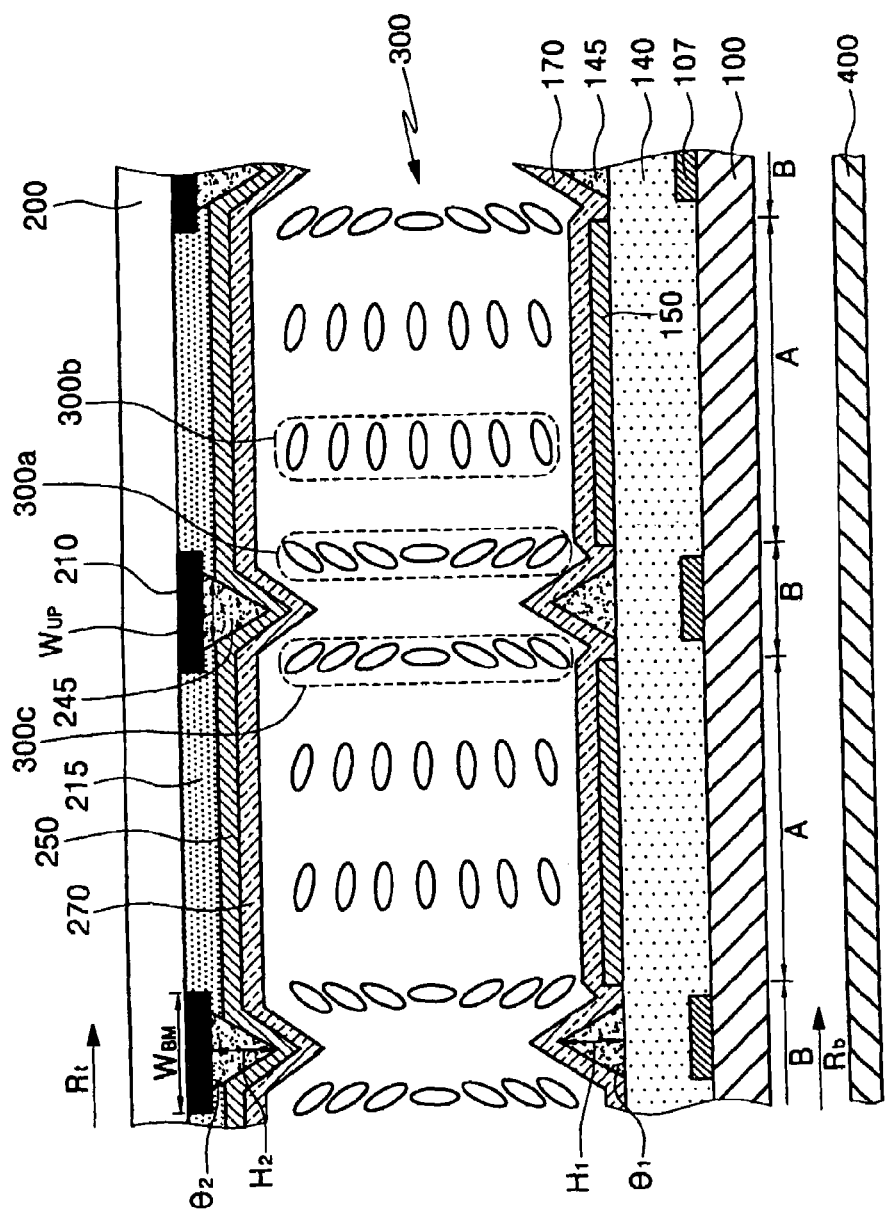
FIG. 1 is a cross-sectional view illustrating an LCD device according to an embodiment of the present invention.

In the following detailed description, exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive. There may be parts shown in the drawings, or parts not shown in the drawings, that are not discussed in the specification, as they are not essential to a complete understanding of the invention. Like reference numerals designate like elements. In a case where it is stated that one layer is formed "on" another layer, this may refer to the one layer being directly on the another layer or to a third layer being interposed between the one layer and the another layer.

FIG. 1 is a cross-sectional view illustrating an LCD device according to an embodiment of the present invention. FIG. 1 shows only a pixel region of the LCD device.

Referring to FIG. 1, a lower substrate 100 includes an opening region A and a non-opening region B which is adjacent to the opening region A. The opening region A is a region through which an image is displayed. On the non-opening region B, a signal line 107 and a thin film transistor (TFT, not shown) may be arranged. The signal line 107 may be a scan line or a data line. The TFT is switched by a control signal of the scan line to apply a voltage of the data line to a pixel electrode 150 which will be explained later.

An insulating layer 140 is arranged to cover the signal line 107 and the TFT. The pixel electrode 150 is arranged on a portion of the insulating layer 140 corresponding to the opening region A. The opening region A may be defined by the pixel electrode 150. The pixel electrode 150 may be formed using indium tin oxide (ITO) or indium zinc oxide (IZO).

Figure 6:
FIG. 6 is a cross-sectional view illustrating various shapes of protrusions.

On a portion of the insulating layer 140 corresponding to the non-opening region B, a lower protrusion 145 may be arranged apart from the pixel electrode 150. The lower protrusion 145 may be arranged to overlap the signal line 107. In addition, the lower protrusion 145 may extend along the signal line 107. Meanwhile, at least one side of the lower protrusion 145 has a slope. In a case where both sides of the lower protrusion 145 have a slope, the slopes may be symmetric or asymmetric. For example, as shown in FIG. 6, the lower protrusion 145 may have a triangular cross section (a) having symmetric slopes, a triangular cross section (b) having asymmetric slopes, a half-circular cross section (c) having symmetric slopes, and/or a half-circular cross section (d) having asymmetric slopes. An angle of the slope, i.e., an angle $\theta_1$ formed by the slope and the lower substrate 100, is in a range from 10° to 80°. In a case where the angle $\theta_1$ is less than 10°, an efficiency resulting from the lower protrusion 145 may be reduced because the same effect can be obtained by an alignment treatment for a lower alignment layer 170 which will be explained later. In a case where the angle $\theta_1$ exceeds 80°, a bend-transition efficiency resulting from the angle $\theta_1$ may be reduced. In one embodiment, the angle $\theta_1$ is in a range from 10° to 60° so that a bend alignment can be more stabilized.

The lower alignment layer 170 is arranged to cover the lower protrusion 145 and the pixel electrode 150. The lower alignment layer 170 may be formed using an organic or inorganic layer. In one embodiment, the lower alignment layer 170 is formed using a polyimide-like organic layer. The lower alignment layer 170 may be parallel-aligned or tilt-aligned to have a predetermined tilt angle in which an alignment treatment is performed in a first direction Rb. The alignment treatment may be performed using a rubbing technique or a photo-alignment technique. Generally, a pretilt angle for the tilt alignment is less than 10°.

In a case where the lower protrusion 145 extends along the signal line 107, the alignment direction Rb of the lower alignment layer may be substantially perpendicular to an extending direction of the lower protrusion 145. Hence, a major axis direction of a liquid crystal adjacent to the lower alignment layer 170 can be placed along the slope with the angle $\theta_1$. As a result, a pretilt angle of a liquid crystal adjacent to the lower alignment layer 170 can be adjusted to be substantially the same as the tilt angle $\theta_1$ of the lower protrusion 145.

Figure 5:
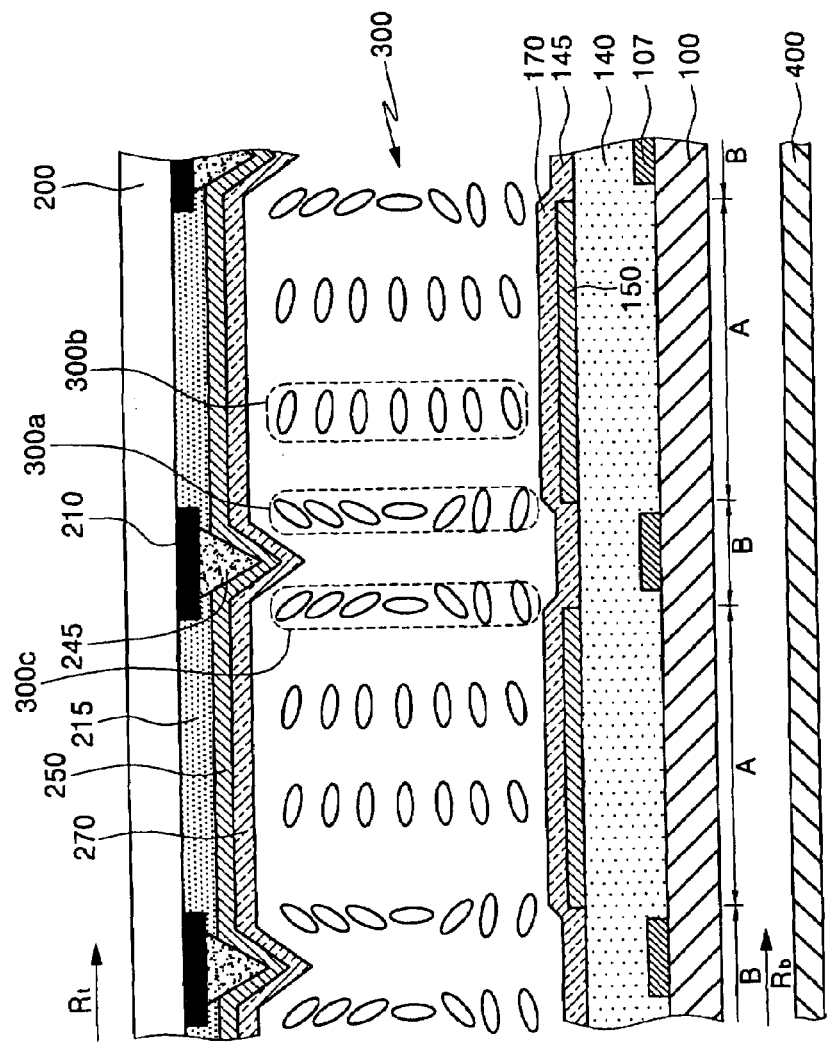
FIG. 5 is a cross-sectional view illustrating an LCD device according to another embodiment of the present invention.

Alternatively, in one embodiment, the lower protrusion 145 may be omitted. An LCD device having no lower protrusion is shown in FIG. 5.

Referring back to FIG. 1, an upper substrate 200 having an opposite surface is arranged above the lower substrate 100. The opposite surface is opposing the lower substrate 100. A light shielding layer pattern 210 may be arranged on a portion of the upper substrate 200 corresponding to the non-opening area B. The light shielding layer pattern 210 shields areas corresponding to areas where the TFT and the signal line 107 are located and exposes an area corresponding to the opening area A.

On a portion of the opening area A exposed by the light shielding layer pattern 210, a color filter 215 may be arranged. The color filter 215 may include red, green and blue color filters, each of which corresponds to each unit pixel.

An upper protrusion 245 is located on the light shielding layer pattern 210, i.e., the light shielding layer pattern 210 is located between the upper protrusion 245 and the upper substrate 200. The upper protrusion 245 may be located in a region corresponding to the non-opening area B. In one embodiment, a width $W_{UP}$ of the upper protrusion 245 is the same as or smaller than a width $W_{BM}$ of the light shielding layer pattern 210. In one embodiment, the width $W_{UP}$ of the upper protrusion 245 is smaller than the width $W_{BM}$ of the light shielding layer pattern 210.

Like the lower protrusion 145, at least one side of the upper protrusion 245 has a slope. In a case where both sides of the upper protrusion 245 have a slope, the slopes may be symmetric or asymmetric. For example, as shown in FIG. 6, the upper protrusion 245 may have a triangular cross section (a) having symmetric slopes, a triangular cross section (b) having asymmetric slopes, a half-circular cross section (c) having symmetric slopes, and a half-circular cross section (d) having asymmetric slopes. An angle of the slope, i.e., an angle $\theta_2$ formed by the slope and the upper substrate 200, is in a range of 10° to 80°. In a case where the angle $\theta_2$ is less than 10°, an efficiency resulting from the upper protrusion 245 may be reduced because the same effect can be obtained by alignment treatment for an upper alignment layer 270 which will be explained later. In a case where the angle $\theta_2$ exceeds 80°, a bend-transition efficiency resulting from the angle $\theta_2$ may be reduced. In one embodiment, the angle $\theta_2$ is in a range from 10° to 60° so that a bend alignment can be more stabilized.

In one embodiment, the upper and lower protrusions 245 and 145 are located to correspond to each other. In case a where the lower protrusion 145 extends along the signal line 107, the upper protrusion 245 also extends in the same direction along the signal line 107.

An opposite electrode 250 is arranged to cover the upper protrusion 245 and the color filter 215. In other words, the opposite electrode 250 is arranged on the opposite surface of the upper substrate 200 having the upper protrusion 245. The opposite electrode 250 may be an indium tin oxide (ITO) layer or an indium zinc oxide (IZO) layer.

The upper alignment layer 270 may be arranged on the upper opposite electrode 250. The upper alignment layer 270 may be formed using an organic or inorganic layer. In one embodiment, the upper alignment layer 270 is formed using a polyimide-like organic layer. The upper alignment layer 270 may be parallel-aligned or tilt-aligned to have a predetermined tilt angle, in which an alignment treatment is performed in a direction Rt that is substantially the same as the alignment direction Rb of the lower alignment layer 170. Thus, in case where the upper protrusion 245 extends along the signal line 107, the alignment direction Rt may be substantially perpendicular to an extending direction of the upper protrusion 245. Hence, a major axis direction of a liquid crystal adjacent to the upper alignment layer 270 can be placed along the slope with the angle $\theta_2$. As a result, a pretilt angle of a liquid crystal adjacent to the upper alignment layer 270 can be adjusted to be substantially the same as the tilt angle $\theta_2$ of the upper protrusion 245.

An OCB mode liquid crystal layer 300 is arranged between the lower alignment layer 170 and the upper alignment layer 270, i.e., between the pixel electrode 150 and the opposite electrode 250. The OCB mode liquid crystal layer 300 may include nematic liquid crystals having a dielectric constant anisotropy that is positive. In one embodiment, the liquid crystals of the liquid crystal layer 300 are classified into liquid crystals 300b which are located apart from the protrusions 145 and 245 and liquid crystals 300a and 300c which are located adjacent to the protrusions 145 and 245.

Among the liquid crystals 300b which are located apart from the protrusions 145 and 245, the lower and upper liquid crystals which are respectively adjacent to the lower and upper alignment layers 170 and 270 are parallel-aligned or tilt-aligned with a pretilt angle of less than 10° in the alignment directions Rb and Rt due to the anchoring force of the alignment layer 170 and 270. However, among the liquid crystals 300a and 300c which are located adjacent to the protrusions 145 and 245, the lower liquid crystals which are adjacent to the lower alignment layer 170 are arranged with a pretilt angle close to the tilt angle $\theta_1$ of the lower protrusion 145 due to the anchoring force of the lower alignment layer 170 which covers the lower protrusion 145, and liquid crystals which are adjacent to the upper alignment layer 270 are arranged with a pretilt angle close to the tilt angle $\theta_2$ of the upper protrusion 245 due to the anchoring force of the upper alignment layer 270 which covers the upper protrusion 245.

Figure 7:
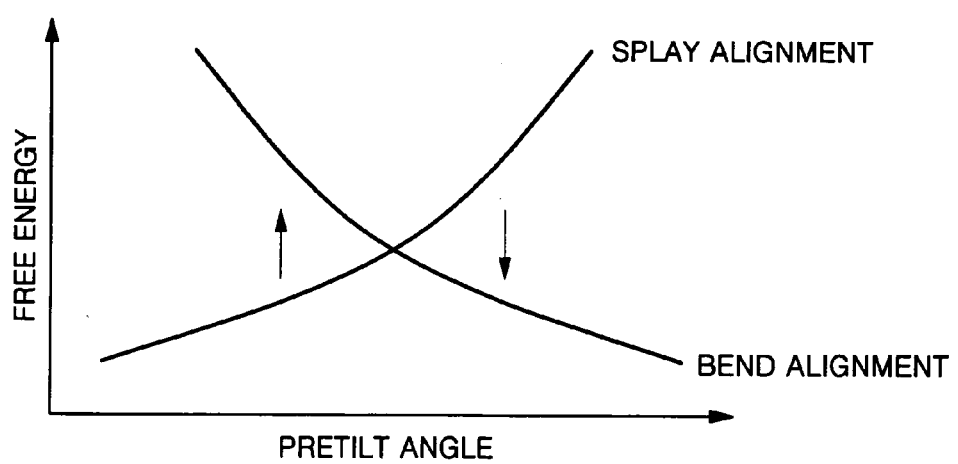
FIG. 7 shows free energies of a splay alignment and a bend alignment according to variations of pretilt angles.

FIG. 7 shows free energies of a splay alignment and a bend alignment according to variations of pretilt angles. Referring to FIG. 7, as the pretilt angle is increased, the free energy of the bend alignment will eventually stabilize to become lower than that of the splay alignment. Because of this, the liquid crystals 300b which are located apart from the protrusions 145 and 245 have the splay alignment, and most of the liquid crystals 300a and 300c which are located adjacent to the protrusions 145 and 245 have an alignment that is close to the bend alignment. Further, a case where the lower and upper protrusions 145 and 245 are formed at locations corresponding to each other has a closer alignment to the bend alignment than a case where the lower protrusion 145 is not formed. However, some of the liquid crystals 300a and 300c which are arranged adjacent to the protrusions 145 and 245 may remain closer to the splay alignment.

Meanwhile, the liquid crystals 300a and 300c which are located on left and right sides of the protrusions 145 and 245 differ in direction of the pretilt angle, and thus, there may occur a disclination line therebetween. However, by forming the upper protrusion 245 on the light shielding layer pattern 210, a display quality degradation resulting from the disclination line can be substantially reduced or prevented. This effect is even more prominent when the width $W_{UP}$ of the upper protrusion 245 is the same as or smaller than the width $W_{BM}$ of the light shielding layer pattern 210.

The liquid crystal display device may further include a back light device 400 which provides white light to a bottom portion of the lower substrate 100. The liquid crystal display device can implement a color image using the color filter layer 215.

Alternatively, the back light device 400 may include red (R), green (G) and blue (B) back lights that may be arranged below the lower substrate 100. In this case, the color filter layer 215 is omitted. Such a liquid crystal display device is referred to as a field sequential liquid crystal display (FS-LCD) device. The FS-LCD device time-divisionally and/or sequentially displays red, green or blue lights through a liquid crystal located in one unit pixel and displays a color image using an afterimage effect. This liquid crystal display device has rapid response speed and thus is suitable for implementing a moving picture.

Figure 2:
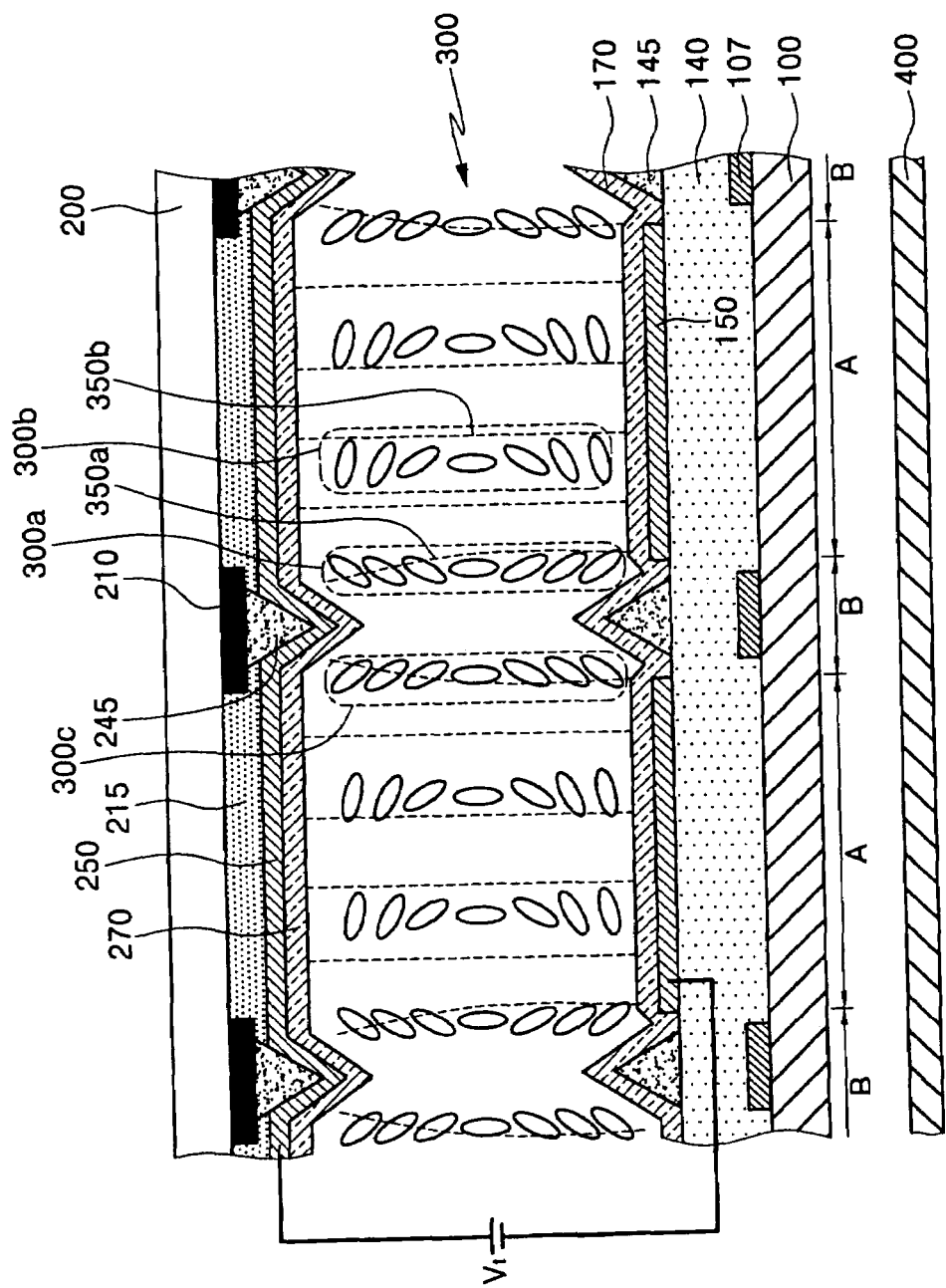
FIG. 2 is a cross-sectional view illustrating a bend transition of the LCD device of FIG. 1.

FIG. 2 is a cross-sectional view illustrating a bend transition of the LCD device of FIG. 1.

Referring to FIG. 2, a voltage is applied to the pixel electrode 150 and another voltage is applied to the opposite electrode 250, so that the pixel electrode 150 and the opposite electrode 250 have a predetermined voltage difference Vt therebetween. As a result, electric fields 350a and 350b are formed between the pixel electrode 150 and the opposite electrode 250. That is, the electric field 350b in the form of a straight line is formed in a vertical direction in a region where a plane portion of the opposite electrode 250 and another plane portion of the pixel electrode 150 face each other. However, the electric field 350a in the form of a bent line is formed in a vertical direction in a region where a protruding portion of the opposite electrode 250 by the upper protrusion 245 and an edge of the pixel electrode 150 face each other. Since the protruding portion of the opposite electrode 250 by the upper protrusion 245 is relatively closer in distance to the pixel electrode 150 than other portions (e.g., the plane portions), a relatively strong electric field is formed. Due to the distorted and strong electric field, among the liquid crystals adjacent to the upper protrusion 245, the liquid crystals, which remain splay-aligned or are not sufficiently transited to the bend alignment, can now be more rapidly transited to the bend alignment. In short, since the opposite electrode 250 is arranged on the upper protrusion 245, the electric field can be distorted and can become stronger, so that the liquid crystals adjacent to the upper protrusion 245 can be sufficiently transited to the bend alignment in a short time.

The bend transition is propagated to the other region from the liquid crystals already transited into the bend alignment, i.e., the transition kernel. Thus, the liquid crystals located in the whole liquid crystal layer 300 are transited to the bend alignment. As a result, due to the liquid crystals now being more rapidly transited to the bend alignment, a time that the bend transition is propagated to the whole liquid crystal layer 300, i.e., a transition time, can be reduced, and also a transition voltage, too, can be reduced.

Thereafter, a voltage difference between the pixel electrode 150 and the opposite electrode 250 remains higher than a critical voltage Vcr to maintain the bend alignment. If the voltage difference is increased, a tilt angle of the rest of the liquid crystals other than the liquid crystals which are adjacent to the alignment layers 170 and 270 and the liquid crystals which are located in central portion, is increased, and if the voltage difference is reduced, the tilt angle is decreased. Thus, polarized light which passes through the liquid crystal layer 300 is modified, thereby forming an image. The variation of the tilt angle of those liquid crystals is of such a fast speed that a rapid response time can be achieved. The liquid crystal display device described above is an OCB mode LCD device, and, in one embodiment, the OCB mode LCD device is driven by a field sequential driving method to achieve an even faster response speed.

FIGS. 3A, 3B, 4A and 4B are cross-sectional views illustrating a method of fabricating an LCD device according to an embodiment of the present invention, which show only a pixel region of the LCD device.

Figure 3A:
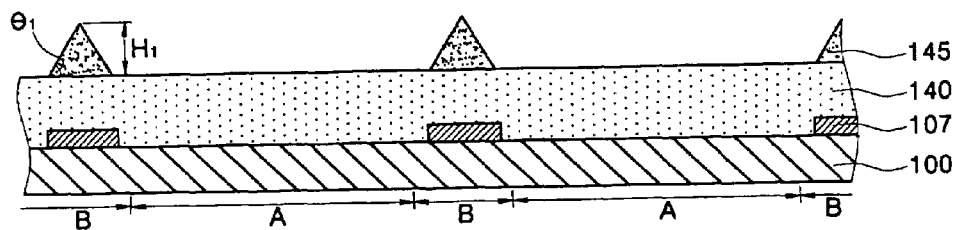
FIGS. 3A, 3B, 4A and 4B are cross-sectional views illustrating a method of fabricating an LCD device according to an embodiment of the present invention, which show only a pixel region of the LCD device.

Referring to FIG. 3A, a conductive material layer is deposited on a lower substrate 100 having an opening region A and a non-opening region B which is adjacent to the opening region A. The conductive material layer is patterned to form a signal line 107 on the non-opening region B. The signal line 107 may be a scan line or a data line. An insulating layer 140 is formed above the whole surface of the lower substrate 100 while covering the signal line 107.

A lower protrusion 145 is formed on a portion of the insulating layer 140 corresponding to the non-opening region B. The lower protrusion 145 may be formed using an organic or inorganic layer. The organic layer may be formed using an acrylic-based polymer layer or a benzocyclobutene (BCB) layer, and the inorganic layer may be formed using a silicon oxide layer or a silicon nitride layer. At least one side of the lower protrusion 145 has a slope. A tilt angle of the slope, i.e., an angle θ₁ formed by the slope and the lower substrate, is in a range between 10° and 80°. More preferably, the tilt angle θ₁ of the slope is in a range between 10° and 60°.

The protrusion 145 in which at least one side has a slope may be formed using a press technique, an oblique evaporation technique, a photolithography technique, and/or a laser beam machining technique. In more detail, the protrusion 145 may be formed using the press technique such that an organic layer is deposited on the insulating layer 140, then a mold having grooves is placed on the organic layer, next heat and pressure are applied to the mold and then cooled, and finally the mold is separated from the substrate 100. The protrusion 145 may be formed using the oblique evaporation technique by depositing a protrusion line material at a predetermined tilt angle against the substrate 100. The protrusion 145 may be formed using the photolithography technique such that a protrusion line material is deposited on the substrate 100, then a photoresist is formed on the protrusion material, next the photoresist is exposed to light using a photo mask having a pattern which continuously changes light transmittance to thereby form a photoresist pattern, and finally the protrusion line material is etched using the photoresist pattern as a mask. The protrusion 145 may be formed using the laser beam machining technique such that a protrusion material is deposited on the substrate 100, and then a laser beam is irradiated to the protrusion material at a predetermined tilt angle.

Figure 3B:
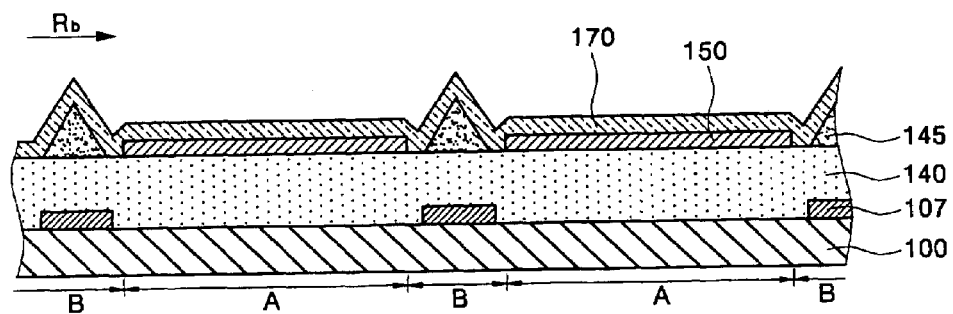

Referring to FIG. 3B, a pixel conductive material layer is deposited on the substrate 100 having the lower protrusion 145 and then patterned to form a pixel electrode 150 above the opening region A which is apart from the lower protrusion 145. The pixel conductive material layer may be formed using ITO or IZO. Alternatively, the lower protrusion 145 may be formed after the pixel electrode 150 is formed.

A lower alignment layer 170 is formed on the whole surface of the lower substrate including the pixel electrode 150. The lower alignment layer 170 may be formed using an organic or inorganic layer. In one embodiment, the lower alignment layer 170 is formed using a polyimide-based organic layer. Subsequently, the lower alignment layer 170 is parallel-aligned or tilt-aligned in a first direction Rb. The alignment treatment may be performed using a rubbing technique or a photo-alignment technique.

Figure 4A:
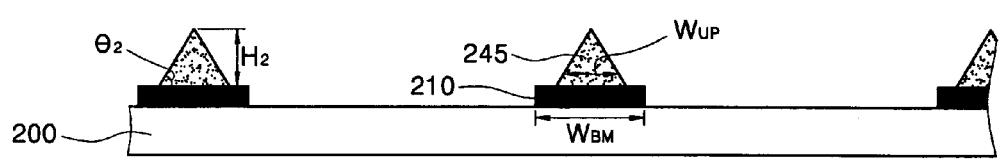

Referring to FIG. 4A, an upper substrate 200 is prepared. A light shielding layer pattern 210 is formed on the upper substrate 200. The light shielding layer pattern 210 is formed on a region corresponding to a non-opening region (e.g., the non-opening region B in FIG. 3B) of a lower substrate (e.g., the lower substrate 100 in FIG. 3B) to expose another region corresponding to an opening region (e.g., the opening region A in FIG. 3B) of the lower substrate.

An upper protrusion 245 is formed on the light shielding layer pattern 210. At least one side of the upper protrusion 245 has a slope. In one embodiment, a tilt angle of the slope, i.e., an angle θ₂ formed by the slope and the upper substrate 200, is in a range between 10° and 80°. In one embodiment, the tilt angle θ₁ of the slope is in a range between 10° and 60°. A material and method of forming the upper protrusion 245 may be substantially the same as the material and method of forming the lower protrusion 145.

Figure 4B:
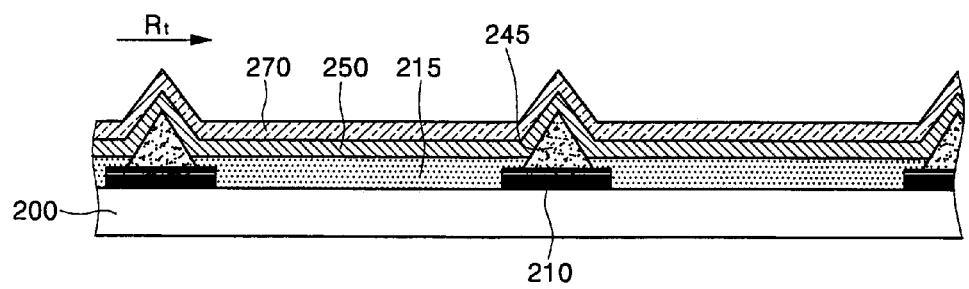

Referring to FIG. 4B, a color filter layer 215 is formed on an exposed portion by the light shielding layer pattern 210.

An opposite electrode 250 is formed to cover the color filter layer 215 and the upper protrusion 245. An upper alignment layer 270 is formed on the opposite electrode 250, and the upper alignment layer 270 is aligned in a second direction Rt that is substantially the same as the lower alignment layer 170. A material and alignment method of the upper alignment layer 270 may be substantially the same as those of the lower alignment layer 170.

Finally, the lower substrate 100 and the upper substrate 200 are attached to each other to have a predetermined gap therebetween, and a liquid crystal is injected into a space between the lower and upper substrates 100 and 200 for forming an OCB mode liquid crystal layer 300, thereby completing the LCD device of FIG. 1.

In view of the foregoing, according to an OCB mode LCD device of the present invention, by forming an opposite electrode on an upper protrusion, a bend transition time can be reduced, and a sufficient bend transition can be induced. Further, by forming an upper protrusion on a light shielding layer pattern, a display quality can improved.

What is claimed is:

1. A liquid crystal display device comprising:
   a lower substrate having an opening region and a non-opening region adjacent to the opening region;
   a pixel electrode located on the opening region;
   an upper substrate located apart from the lower substrate and having an opposite surface facing the lower substrate;
   an upper protrusion located on a portion of the opposite surface corresponding to the non-opening region;
   an opposite electrode located on the upper protrusion;
   an optically compensated bend (OCB) mode liquid crystal layer located between the pixel electrode and the opposite electrode; and
   a lower protrusion, completely corresponding to the upper protrusion, located on the non-opening region of the lower substrate to overlap a signal line on the non-opening region of the lower substrate.

2. The device of claim 1, wherein the upper protrusion and the lower protrusion are located to at least partially correspond to each other.

3. The device of claim 1, wherein at least one side of the lower protrusion has a slope.

4. The device of claim 3, wherein an angle formed by the slope and the lower substrate is in a range between 10° and 80°.

5. The device of claim 4, wherein the angle formed by the slope and the lower substrate is in a range between 10° and 60°.

6. The device of claim 1, further comprising a light shielding layer pattern located between the upper protrusion and the opposite surface.

7. The device of claim 1, wherein the lower protrusion is apart from the pixel electrode along an alignment direction of an alignment layer on the lower substrate.

8. The device of claim 1, wherein the lower protrusion is between the pixel electrode and another pixel electrode located on another opening region of the lower substrate.

9. A liquid crystal display device comprising:
   a lower substrate having an opening region and a non-opening region adjacent to the opening region;
   a pixel electrode located on the opening region;
   an upper substrate located apart from the lower substrate and having an opposite surface facing the lower substrate;
   an upper protrusion located on a portion of the opposite surface corresponding to the non-opening region;
   an opposite electrode located on the upper protrusion;
   an optically compensated bend (OCB) mode liquid crystal layer located between the pixel electrode and the opposite electrode; and
   a light shielding layer pattern located between the upper protrusion and the opposite surface,
   wherein a width of the upper protrusion is not greater than a width of the light shielding layer pattern.

10. The device of claim 9, wherein at least one side of the upper protrusion has a slope.

11. The device of claim 10, wherein an angle formed by the slope and the upper substrate is in a range between 10° and 80°.

12. The device of claim 11, wherein the angle formed by the slope and the upper substrate is in a range between 10° and 60°.

13. The device of claim 9, wherein the width of the upper protrusion is smaller than the width of the light shielding layer pattern.

14. The device of claim 9, further comprising a lower alignment layer located on the pixel electrode and an upper alignment layer located on the opposite electrode, wherein the lower and upper alignment layers have substantially the same alignment direction.

15. The device of claim 9, further comprising a color filter located on a portion of the opposite surface corresponding to the opening region.

16. The device of claim 9, further comprising, red (R), green (G), and blue (B) backlights, wherein the lower substrate is between the R, G, and B backlights and the upper substrate.

17. The device of claim 9, wherein the OGB mode liquid crystal layer includes a nematic liquid crystal having a positive dielectric constant anisotropy.

18. A method of fabricating a liquid crystal display device, the method comprising:
   forming a pixel electrode on an opening region of a lower substrate having the opening region and a non-opening region adjacent to the opening region;
   forming an upper protrusion on a portion of an upper substrate corresponding to the non- opening region;
   forming an opposite electrode on the upper protrusion;
   attaching the lower and upper substrates in a manner for the opposite electrode to face the lower substrate;
   injecting a liquid crystal into a space between the lower and upper substrates to form an optically compensated bend (OCB) mode liquid crystal layer; and
   forming a lower protrusion on the non-opening region before or after the forming of the pixel electrode to completely correspond to the upper protrusion and to overlap a signal line on the non-opening region of the lower substrate.

19. The method of claim 18, wherein at least one side of the lower protrusion has a slope.

20. The method of claim 18, wherein the lower protrusion is formed using a technique selected from the group consisting of a press technique, an oblique evaporation technique, a photolithography technique, a laser beam machining technique, and combinations thereof.

21. The method of claim 18, further comprising, forming a light shielding layer pattern in a region of the upper substrate corresponding to the non-opening area before forming the upper protrusion.

22. A method of fabricating a liquid crystal display device, the method comprising:
   forming a pixel electrode on an opening region of a lower substrate having the opening region and a non-opening region adjacent to the opening region;
   forming an upper protrusion on a portion of an upper substrate corresponding to the non-opening region;
   forming an opposite electrode on the upper protrusion;
   attaching the lower and upper substrates in a manner for the opposite electrode to face the lower substrate;
   injecting a liquid crystal into a space between the lower and upper substrates to form an optically compensated bend (OCB) mode liquid crystal layer; and
   forming a light shielding layer pattern in a region of the upper substrate corresponding to the non-opening area before forming the upper protrusion, wherein the upper protrusion is formed to have a first width and the light shielding layer pattern is formed to have a second width, and wherein the first width is not greater than the second width.

23. The method of claim 22, wherein at least one side of the upper protrusion has a slope.

24. The method of claim 23, wherein the upper protrusion is formed using a technique selected from the group consisting of a press technique, an oblique evaporation technique, a photolithography technique, a laser beam machining technique, and combinations thereof.

25. The method of claim 22, further comprising, before the attaching of the lower and upper substrates, forming a lower alignment layer on the pixel electrode and then aligning the lower alignment layer in a first direction, and forming an upper alignment layer on the opposite electrode and then aligning the upper alignment layer in a second direction, wherein the second direction is substantially the same as the first direction of the lower alignment layer.

26. The method of claim 25, wherein the aligning of the lower alignment layer and the aligning of the upper aligning layer are performed using a rubbing technique or a photo-alignment technique.

27. The method of claim 22, further comprising, forming a color filter on a portion of the upper substrate corresponding to the opening region before or after forming the upper protrusion.

28. The method of claim 22, wherein the liquid crystal is a nematic liquid crystal having a positive dielectric constant anisotropy.

* * * * *